May 19, 1953   A. MENDEZ   2,638,752
COOLING SYSTEM AND APPARATUS FOR MOTOR VEHICLES
Filed Sept. 9, 1950   2 Sheets-Sheet 1
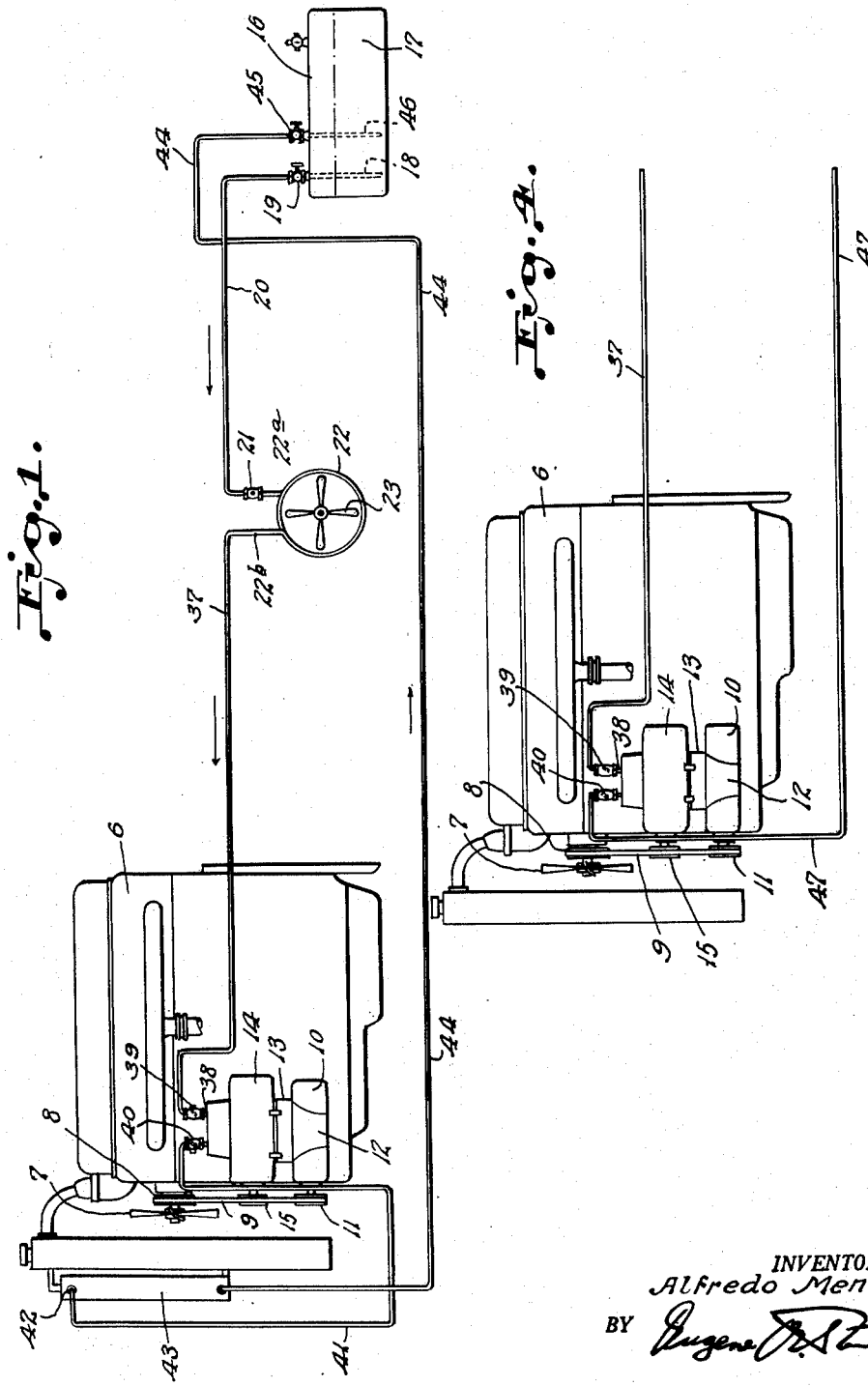
INVENTOR.
Alfredo Mendez
BY
ATTORNEY.

May 19, 1953 A. MENDEZ 2,638,752
COOLING SYSTEM AND APPARATUS FOR MOTOR VEHICLES
Filed Sept. 9, 1950 2 Sheets-Sheet 2
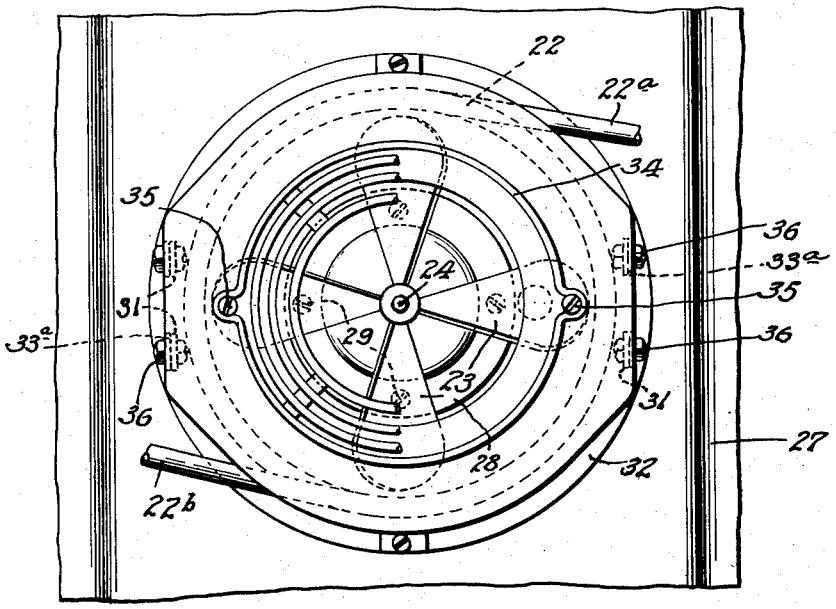
Fig. 3.
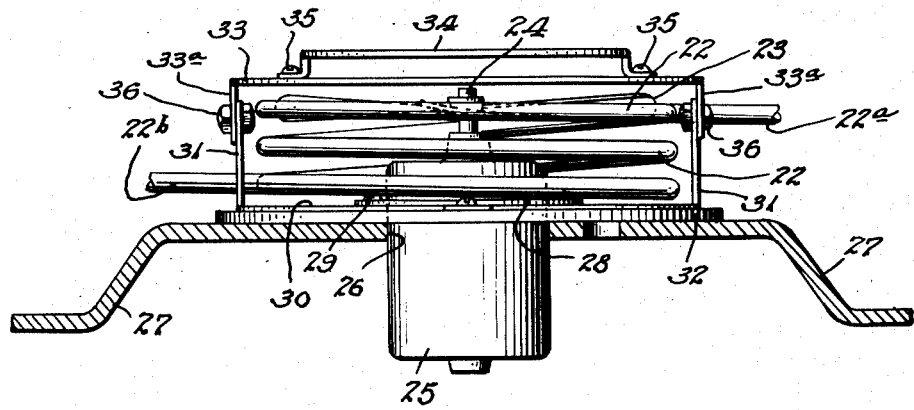
Fig. 2.
INVENTOR.
Alfredo Mendez
BY
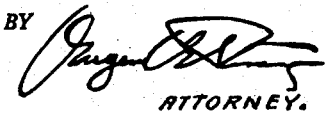
ATTORNEY.

Patented May 19, 1953

2,638,752

UNITED STATES PATENT OFFICE 2,638,752

COOLING SYSTEM AND APPARATUS FOR MOTOR VEHICLES

Alfredo Méndez, Chicago, Ill.

Application September 9, 1950, Serial No. 184,036

4 Claims. (Cl. 62—117)

This invention relates to an apparatus and system for cooling the interior of a motor vehicle or other type vehicle which is provided with a motor or other power source.

Some of the features of the present invention are disclosed in my co-pending application, Serial No. 171,067, filed June 29, 1950.

The main object of the invention is to provide a cooling system for a motor vehicle interior in which propane or butane is used as the cooling medium, the propane in its liquid form being conveyed from a storage tank to an ordinary expansion valve and from there into the coils of a heat exchanger and thereafter to a compressor which returns the propane gas to the storage tank, which gas upon entering the storage tank immediately becomes liquified for re-use in the system.

A further object of the invention provides for the operation of the compressor from the usual fan belt of the motor of a vehicle, but the same of course could be operated from other moving parts of a motor, such as the armature shaft of an electric motor.

A further feature of the invention includes the use of a condenser through which the gas may be passed after it leaves the compressor to thereby be liquified and returned to the storage tank.

Still another advantageous phase of the invention resides in the provision of a motor driven fan in association with the cooler coils for distributing the cool air to the interior of the vehicle.

Other objects and advantages will become apparent to those skilled in the art when considered in connection with the accompanying drawings in which:

Fig. 1 is a diagrammatic view illustrating my cooling system in association with a motor vehicle, in which only the usual motor and radiator are shown;

Fig. 2 is an enlarged side elevational view of the heat exchange coil and blower of Fig. 1;

Fig. 3 is an enlarged top plan view of Fig. 2; and

Fig. 4 is a partial diagrammatic view illustrating the system when the condenser of Fig. 1 is omitted.

Referring specifically to the drawings in which like numerals have been used to designate similar parts throughout the various views, and referring to Fig. 1, a usual vehicle internal combustion motor is diagrammatically shown at 6, including the usual driven fan 7 having the pulley 8 and driven by the fan belt shown at 9. Supported adjacent the lower side of the motor block 6 is the usual generator 10 provided with a driving pulley 11 over which the belt 9 is trained. A bracket 12 encircles the generator and terminates at its upper side in a box-shaped structure 13 onto which is removably attached, as by bolts or the like, a conventional piston compressor 14. This piston compressor 14 is provided at its front end with a pulley 15 contacting the fan belt 9, whereby upon operation of the motor 6, the compressor is driven in its usual manner.

At the rear portion of the motor vehicle, and preferably disposed within the rear trunk compartment, is a relatively small storage tank 16, which tank is adapted to be supplied with and hold liquified propane 17 (or similar gas), said propane within the tank being under sufficient pressure to keep the propane in its liquid state. Thus, the propane can be introduced into the tank 16 under sufficient pressure head to cause the same to liquify. It will, of course, be understood that the system is not limited to propane, but that butane might be used, and also any of the well known refrigerant liquids, such as Freon, or the like, can be used within the system. However, due to the low cost of propane it is preferred to use the same in the present system.

The tank 16 has a liquid outlet pipe or tube 18 extending well down into the tank below the level of the liquid propane and just outside of the tank 16 the pipe 18 is provided with a hand operated stop valve 19 which can be opened or closed at will, determined by the use or non-use of the cooling system. From the valve 19 a branch 20 of the pipe 18 leads to a well known refrigerating expansion valve 21, that is, a valve which admits predetermined quantities of liquid therethrough, which liquid upon passing the valve immediately becomes gasified. The gasified propane passing through the coils 22 of the heat exchanger produces a cooling effect in the vicinity of the heat exchanger coils 22, the latter having an inlet extension 22a and an outlet 22b. A fan 23 mounted within the confines of the cooling coils on the armature shaft 24 of the electric motor 25 operates to distribute the cooled air within the interior of the vehicle. The fan motor 25 is mounted within a recess 26 formed within the floor board 27 of the motor vehicle, the top of the motor lying slightly above the upper surface of the floor board 27 while the motor proper 25 extends below the floor board surface. The motor is provided with a flange 28 having screws 29 which extend through the flange and into the contiguous bottom sheet metal annulus 30 of the cooling coil and fan housing cage, and through the subjacent fiber mat 32. The fiber mat 32 is disposed on floor board 27 as a vibration absorbing cushion.

The coil and fan-enclosing cage is defined by the sheet metal bottom annulus 30 and has spaced upstanding legs 31, the top annulus or ring 33, and the grille-like cover 34 which is carried by the latter as by being fastened thereto by the screws 35. Bolt and nut connections 36 extend through the opposed legs 31 and a downturned flange 33a at opposite sides of the top annulus 33.

A pipe 37 conveys the gaseous propane from the heat exchanger coil 22 to the intake or suction side 38 of the piston or other type compressor 14 which intake side is provided with a check valve 39 which opens to pass gas into the compressor, but closes to prevent the return thereof to the pipe 37. On the compression stroke of the compressor the gas is expelled through a second check valve 40 at the top of the compressor and into an outlet pipe 41 which pipe leads to the inlet 42 at the upper part of a known type of condenser 43. The gas forced into the condenser 43 is discharged in the form of a liquid from the lower portion thereof into the return pipe 44 through which the same is conveyed through a hand operated valve 45 into the discharge tube 46 which has its lower end spaced relatively close to the bottom of the tank 16.

Therefore, it will be seen and understood that, so long as the vehicle engine is running and operating the compressor, that the returning liquid through the pipe 44, the valve 45 being open, will produce a pressure within the tank 16. Thus, pressure in tank 16 will be sufficient to force the liquid propane through the pipe 20 and through the expansion valve 21, after which the propane is gasified to cool the coils 22, the cold air surrounding said coils being blown by the fan 23 throughout the car interior. The suction created at the suction, or intake, side 38 of the compressor 14, together with the pressure produced in line 37 causes the gasified propane to enter the said intake side of the compressor 14 on its suction stroke. The gas is then discharged on the compression stroke of compressor 14 into the condenser 43 where it is returned to its liquid state and discharged into the return pipe 44 through which it passes back to the storage tank 16 for another cycle as just described. When the motor 6 is not running, of course, there will be no cooling action as the liquid, under such condition, stops flowing at the compressor, and in fact throughout the entire system, the operation of the system depending on the operation of the compressor 14.

In the form of the invention illustrated diagrammatically, in Fig. 4, the operation is substantially the same as with Fig. 1, but however, with the notable exception that in this form of the invention, the condenser 43 is entirely dispensed with and the propane gas from the compressor outlet 40 is delivered directly therefrom to a pipe 47 which in this form of the invention contains propane gas rather than the propane liquid as contained in return pipe 44 of Fig. 1. The gas in return pipe 47 is directed through the return pipe into the inside bottom of the storage tank 16, whereupon the gas coming in contact with the liquid propane within the tank 16 is immediately liquified, to be used again in a subsequent cycle of operation of the system.

It will therefore be seen that I have provided a very simple and especially cheap automobile cooling system. The propane necessary is relatively small, the tank 16 in the trunk of the car occupies very little space and can be positioned in an out-of-the-way place so as not to interfere with normal use of the trunk compartment. The propane liquid is very cheap, and will last indefinitely, as it is adapted to be used over and over again in the system.

It is, of course, to be understood as mentioned earlier herein, that liquifiable gases other than propane are capable of use in the system, such as the well known refrigerants which gasify when passed through an expansion valve.

Therefore, it is not intended that the invention be limited to the present disclosures, which are purely a selected embodiment of the invention of a preferred form, but it is intended that the same be capable of variation and modification within the scope of the following claims.

I claim:

1. In a refrigerant circuit type cooling system for a vehicle having a body-provided wall, a heat exchanger coil included in said circuit and positioned adjacent said wall, the latter having a seat substantially concentric with said coil, a motor having a casing removably carried in said wall seat and providing an armature shaft-carried fan disposed substantially concentrically within said coil, a fan and coil-enclosing guard structure having air discharge openings and a base, mounting means projecting laterally from the motor casing and overlying said guard base, fasteners extending through said mounting means and guard base into said wall to secure the assembly in place and a shock-absorbing pad surrounding said motor casing and interposed between said guard base and wall, said pad secured to said wall by said fasteners.

2. The combination set forth in claim 1 and said guard structure including opposed coil confining side portions rising from said guard base, a removable outer end portion overlying said fan, inwardly extending projections carried by the outer guard portion and overlying the coil confining sides of said guard structure, and fasteners securing said projections to said coil confining sides.

3. The combination set forth in claim 1 and said guard structure including opposed coil confining side portions rising from said guard base, a removable outer end portion overlying said fan, inwardly extending projections carried by the outer guard portion and overlying the coil confining sides of said guard structure, and fasteners securing said projections to said coil confining sides, and a removable cap secured to the outer end of said guard structure and affording access to said fasteners whereby the guard structure and motor casing may be removed as a unit from said wall.

4. The combination set forth in claim 1 and a removable cap secured to the outer end of said guard structure and affording access to said fasteners whereby the guard structure and motor casing may be removed as a unit from said wall.

ALFREDO MÉNDEZ.

References Cited in the file of this patent

UNITED STATES PATENTS

| Number | Name | Date |
|---|---|---|
| 2,036,098 | Pieper et al. | Mar. 31, 1936 |
| 2,199,090 | Palmer | Apr. 30, 1940 |
| 2,212,748 | Parker | Aug. 27, 1940 |
| 2,256,987 | Meyerhoeffer | Sept. 23, 1941 |
| 2,351,700 | Patterson | June 20, 1944 |
| 2,475,897 | Iwanoski | July 12, 1949 |